Dec. 1, 1964  C. H. VAN HARTESVELDT ETAL  3,159,526
LAMINATED BOARD AND METHOD OF MAKING THE SAME
Filed Nov. 21, 1960  4 Sheets-Sheet 3
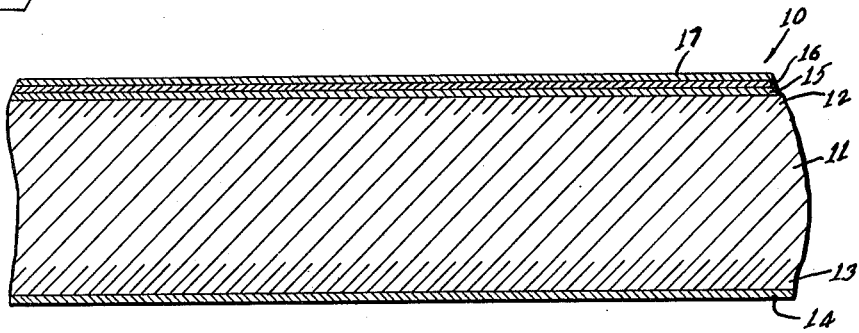
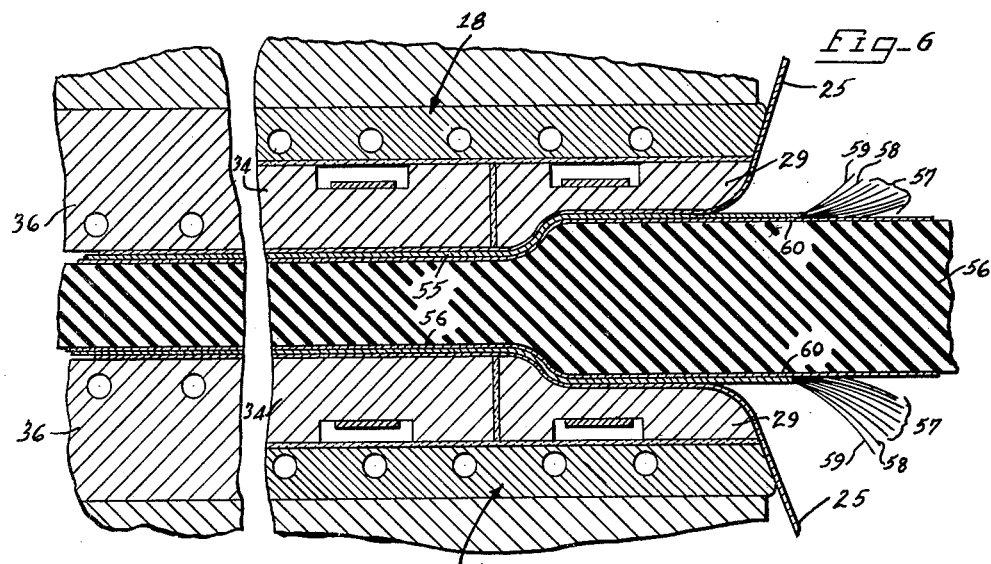
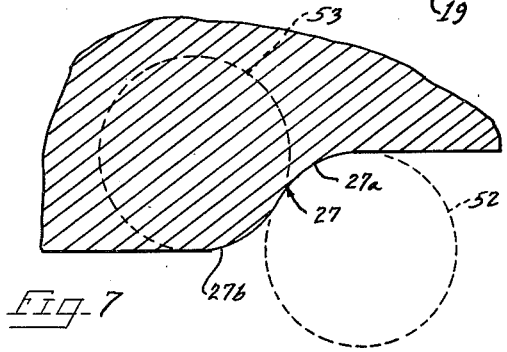
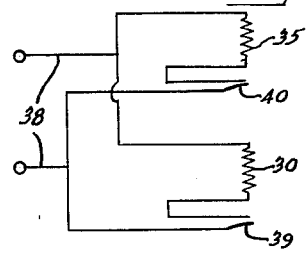
INVENTOR.
Carroll H. Van Hartesveldt
BY Buddy D. Wahl
ATTORNEYS Dec. 1, 1964  C. H. VAN HARTESVELDT ETAL  3,159,526
LAMINATED BOARD AND METHOD OF MAKING THE SAME
Filed Nov. 21, 1960  4 Sheets-Sheet 4

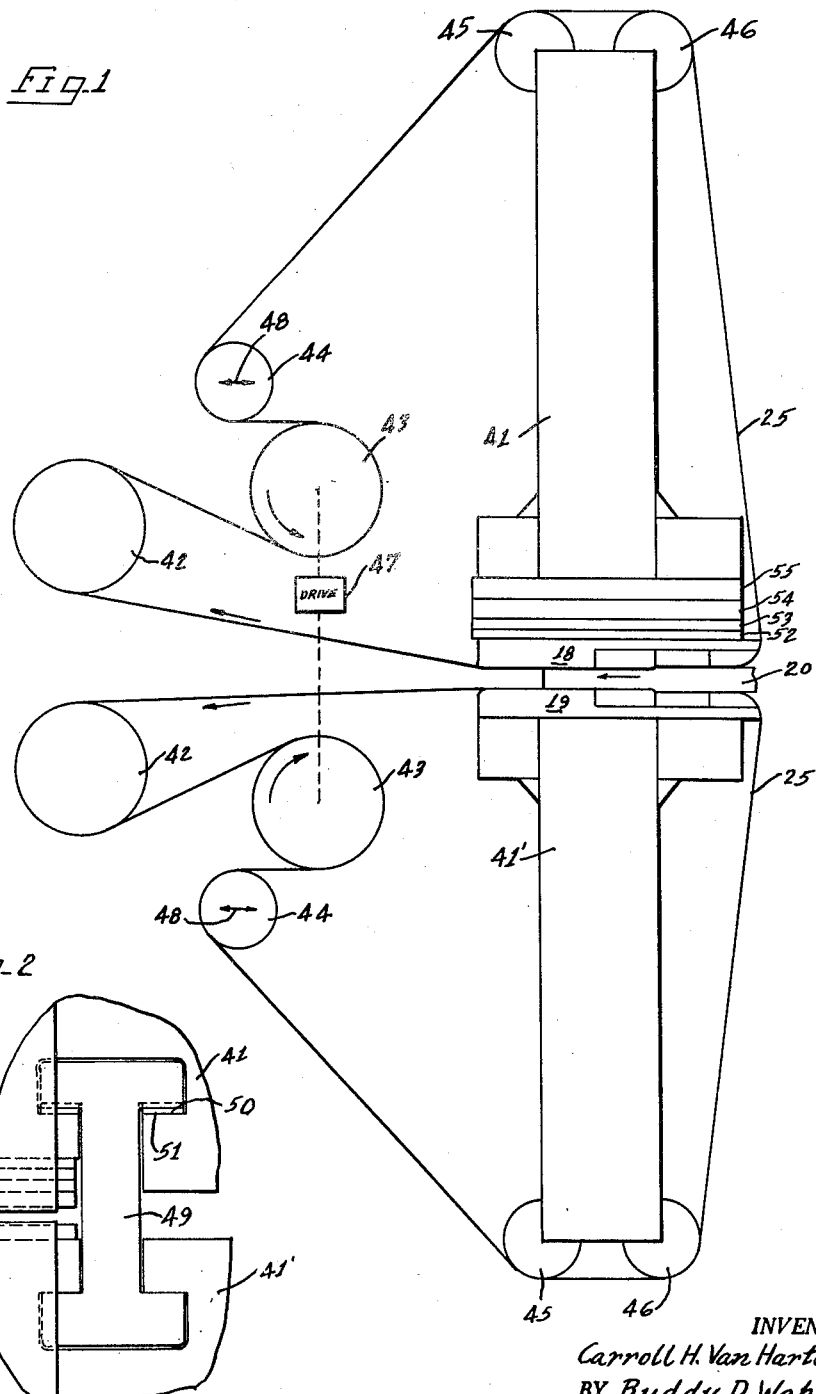
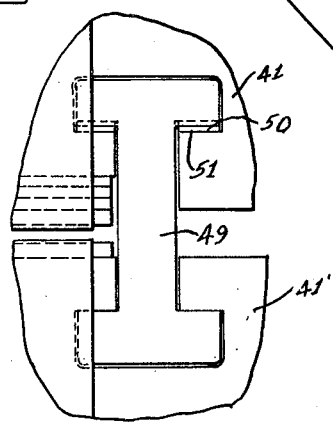
Fig.1
Fig.2
INVENTOR.
Carroll H. Van Hartesveldt
BY Buddy D. Wahl
ATTORNEYS

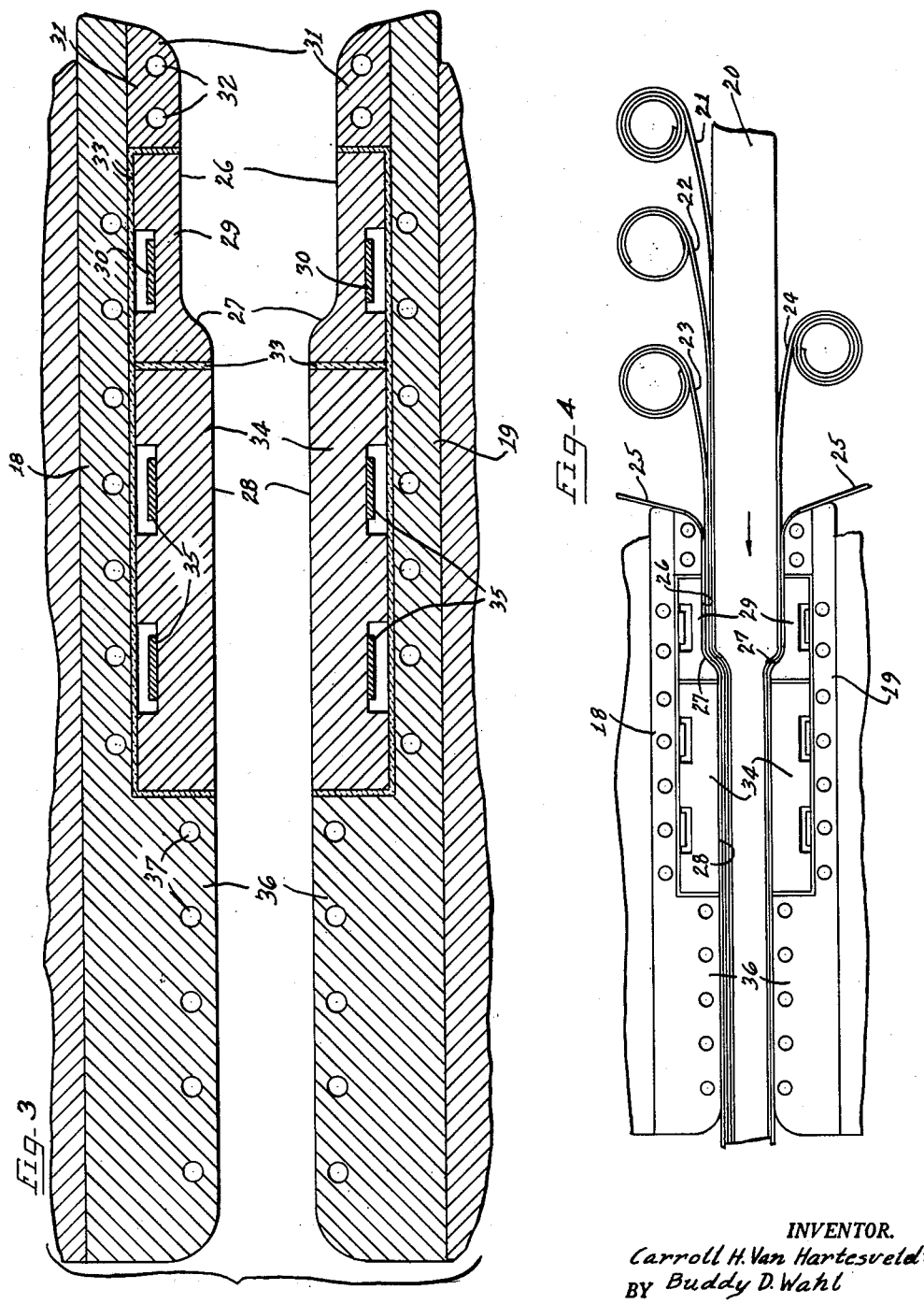

INVENTOR.
Carroll H. Van Hartesveldt
BY Buddy D. Wahl
Hill, Sherman, Meroni, Gross & Simpson
ATTORNEYS United States Patent Office 3,159,526
Patented Dec. 1, 1964

3,159,526
LAMINATED BOARD AND METHOD OF MAKING THE SAME
Carroll H. Van Hartesveldt and Buddy D. Wahl, Toledo, Ohio, assignors, by direct and mesne assignments, to Hoover Ball and Bearing Company
Filed Nov. 21, 1960, Ser. No. 70,498
11 Claims. (Cl. 161—261)

The present invention relates to a method for providing an improved wood product having a finished hardened surface.

Wood surfaces have heretofore been covered with sheets of high pressure plastic laminates for protecting the wood and providing an attractive smooth moisture resistant and heat resistant surface. The plastic laminate sheets are usually cemented to sheets of wood such as plywood or compressed particle boards or wood shavings boards. The plastic laminated sheets are manufactured separately and usually include a large number of core sheets formed of phenolic resin impregnated core stock papers with a melamine resin impregnated pattern paper on the core stock papers and a melamine resin clear overlay on the pattern paper. A feature of the present invention is to provide a finished laminated board with a finished plastic laminate surface wherein the layers of plastic and the wood are joined in a single manufacturing operation and wherein all but one or two of the phenolic resin backing layers are eliminated to effect a substantial saving in material. This is accomplished by the method of the invention which creates a layer or zone of compressed wood on the surface of a board supporting the finishing layers of plastic laminate and supported by the softer core of the board. Another feature of the invention is the rapid curing of the thermosetting impregnants at rates heretofore considered unsuccessful, with the curing being accomplished simultaneously with the lamination of the plastic and wood.

An object of the invention is to provide an improved method for forming laminated surface boards of a structure which effects the saving in eliminating layers of plastic laminates heretofore considered necessary and obtaining a finished product as good as or better than laminated surface boards produced by previous methods.

Another object of the invention is to provide a method for producing a laminated surface board which is capable of joining melamine resin impregnated papers to types of wood products on which conventional methods do not work and in which variations in sub-surface hardness in the wood product do not adversely affect the plastic hard case surface on the wood.

Another object of the invention is to provide a method for rapidly curing thermosetting resins for producing laminated resin sheets and surface boards with finished plastic surfaces.

A still further object of the invention is to provide an improved finished surface board product and an improved method for making the products.

Other objects and advantages will become more apparent with the teaching of the principles of the invention in connection with the disclosure of the preferred embodiments thereof in the specification, claims and drawings, in which:

FIGURE 1 is a side elevational view shown somewhat in schematic form of a machine constructed in accordance with the principles of the present invention;

FIGURE 2 is a detailed fragmentary elevational view of a portion of the mechanism of FIGURE 1;

FIGURE 3 is an enlarged detailed sectional view taken through the shoes or mandrels for forming the product of the present invention;

FIGURE 4 is a side elevational view illustrating the steps in forming the product and feeding material to the machine;

FIGURE 5 is a fragmentary enlarged sectional view of a form of the product of the invention;

FIGURE 6 is a fragmentary side elevational view showing a modified form of the machine;

FIGURE 7 is a greatly enlarged fragmental sectional view taken through the shoe for compressing the material in the process of the invention;

FIGURE 8 is a diagrammatic view of a portion of an electrical circuit for operating the heaters for the shoes.

As shown on the drawings:

Figure 9:
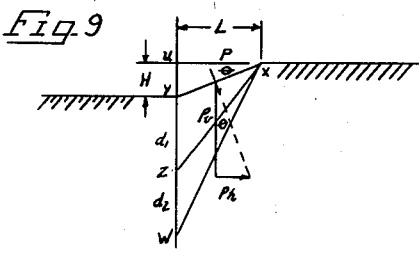
FIGURES 9 through 14 are diagrams showing features of structure and supplementing the mathematical analysis given in the following description.

FIGURE 5 shows a product which takes the form of a finished surface board having a core or zone 11 of wood such as a board, or a sheet of plywood, or a pressed board formed of chips or wood fragments. The core or zone 11 supports case hardened or compressed layers or zones 12 and 13 of wood which are compressed to maximum density at their outer surfaces and when formed by the process of the invention will have a density decreasing substantially linearly inwardly toward the core or zone 11. The hard outer surfaces of the layers or zones 12 and 13 will have a specific gravity of 1.3 to 1.4 and the inner core or zone 11 will have the natural density of the wood which of course will vary with the types of wood employed. The layer or zone 13 may be slightly thicker than the layer or zone 12 to balance the thickness of the total laminations carried on the board, including the plastic laminations, to prevent curling or warping of the board and to permit compression with shoes having steps of equal depth, as will later become clear with the description of the method and mechanism for making the product.

The lower surface layer or zone 13 is covered by a plastic layer 14 provided by putting only one light resin impregnated thermosetting plastic sheet on the surface.

The top finished surface of the laminated surface board is covered with a heavier layer of laminated plastic formed by an inner layer 15, an intermediate layer 16, and an outer layer 17. In the finished product these layers are joined by pressure and heat and the thermosetting plastic is cured. The inner layer or sheet 15 is a phenolic resin impregnated sheet, the intermediate layer 16 is a melamine resin pattern sheet, and the outer layer or sheet 17 is a substantially clear melamine resin (which is preferably alpha-cellulose sheet impregnated with about 50% B-stage melamine-formaldehyde condensate). In some circumstances the lower layer 15 can be omitted but the provision of this single layer 15 or of two layers of phenolic resin have been found to prevent the formation of tiny irregularities and an apparent resultant loss of gloss which occurs with adverse usage and certain test procedures. For example, a test procedure involves subjecting the surface to a temperature of 355° F. for 20 minutes. The provision of the additional lower sheet 15 of core stock phenolic resin paper under the melamine pattern paper prevents an apparent loss of gloss and flatness with this treatment.

In the method of forming the surface board, the layer impregnated with thermosetting resin is applied (e.g. as a conventional B-stage melamine-formaldehyde resin impregnant) and cured and the surface layer on the wood workpiece is compressed in a substantially simultaneous operation. The layers of thermosetting plastic impregnated sheets are placed on the surfaces of a wood workpiece and the plastic is heated rapidly to a highly viscous state, that is, to a temperature so that the resin in the papers will maintain integrity as they are compressed preventing liquid plastic from rupturing the paper. A local pressure is then applied to the outer surface of the plastic covered wood which exceeds the compressive strength of the wood. The local pressure is progressively moved along the wood workpiece so as to form a compressed layer beneath the plastic.

The plastic is then immediately continued to be heated to a relatively high curing temperature on the order of 365° F. for a short curing time and then immediately cooled. A heating time for the curing on the order of 25 seconds with the application of heat at 365° F., and a cooling time of 10 seconds has proved satisfactory (using paper sheets impregnated with 20% of conventional B-stage melamine-formaldehyde condensate). A cure of the melamine resin surface results in the length of time being substantially shorter than heretofore thought possible. Applicants believe that this rapid cure has been made possible because of the rapid heatup and cool down of the material cured. One manufacturer recommends a cure time of 18 to 21 minutes and suggests a curing temperature of 285° F. for one grade and 300° F. for another grade. Another manufacturer of melamine resins recommends a cure time of 20 to 30 minutes at 275° F. (135° C.) or 10 minutes at 302° F. (150° C.). This latter manufacturer also recommends that heating should be regulating to prevent the laminate from exceeding 143–150° C. Another manufacturer of melamine recommends that maximum temperature should not exceed 295° F. By the method of this invention, the plastic is heated in excess of these temperatures, and preferably on the order of 365° F.

Applicants' rapid cure process which is contrary to previous theories, is possible in applicants' preferred form of mechanism, and is not practical in large conventional presses used for high pressure melamine laminates. Applicants' use of an elevated temperature in the new process makes the chemical reaction rapid and is precisely timed for completion so that the time-temperature effect of warmup and cool-down is minimized to insignificant proportions.

In the practice of the instant invention the thermosetting resin used, in each of the specific uses, may be any one or mixtures of the conventional commercially available thermosetting resins, which include the phenolic resins (i.e. phenol-formaldehyde condensation products) and the so-called "amine-formaldehyde" resins ( the preferred members of this group being the melamine-formaldehyde condensation products). These resins are thermosetting, in the sense that they are set to their permanent infusible form by heat, during a process which, of course, involves initial fusion of the resinous material just prior to the setting, or curing process. For use in the lower layers or inner layers of sheeting or paper in the practice of the instant invention, the B-stage phenol-formaldehyde resins are preferred, because the use of these resins has certain economic advantages and they are found to be compatible with the preferred melamine resins which are used in the outer layers or the overlayers. In the practice of the invention, however, the amine-aldehyde resins may also be used. These resins are preferably formed by reaction of formaldehyde with a compound having a plurality of $NH_2$ groups in its molecule, each attached to a carbon atom which in turn is attached by a double bond to O, S or N. Thus in urea, the carbon is attached by a double bond to an oxygen atom. In thiourea the carbon is attached by a double bond to a sulfur atom; and in melamine, each carbon atom having an amino group attached thereto is in turn attached by a double bond to an intracyclic nitrogen atom. Preferred resins of the instant invention are formaldehyde condensates with polyamino triazines, such as melamine, benzoguanamine, ammeline, etc.

Although certain resins are preferred, the instant invention is not limited in use to any particular thermosetting resin. The thermosetting resins go through a cycle that is particularly adapted for use in the instant invention. For example, the thermosetting resins, initially available as condensation products, respond first to heat by liquefying into a fairly fluid state. As soon as the resin is liquefied, however, it starts to become increasingly viscous and ultimately is converted to the hard infusible state. All of this involves a very rapid cycle in conventional molding processes. In laminating processes, however, the cycle is much slower, because of difficulties in heating through the plies of the laminate and difficulties encountered by thermal damage to the plies. In the practice of the instant invention, however, an extremely rapid heating cycle is effected by the use of the particular heating means in conjunction with the extreme pressures to which the resins are subjected. This makes possible the use of higher curing temperatures without thermal damage to the plies and/or resin, because of the extremely short cycle. The invention involves conversion of the resin from its initial thermosetting or B-stage condition to the thermoset or infusible condition simultaneously with the compression step, and during the same overall period of time that the compression step is carried out. The temperature used to effect the curing or thermosetting of the resin is, of course, a temperature in the range from about 30 to about 100° F. above the conventional curing temperatures for laminating resins. It is, in fact, a temperature that is sufficient to effect curing of the resin under the conditions and within the time cycle provided for carrying out the compression step. The time cycle may range from a minimum of about 10 to 15 seconds to a practical maximum of about 1 minute. The resin curing temperatures for the preferred phenolic or polyamine-formaldehyde condensates may range from about 300 to 330° F. to as much as about 375° F. The concentration of resin impregnant in the individual sheets or layers may range from a practical minimum of about 5% (by weight) to a practical maximum of about 60%.

For the application of heat and pressure a pair of opposed shoes 18 and 19, FIGURES 3 and 4, are used. FIGURE 4 illustrates a wood workpiece 20 being moved between the mandrels or shoes 18 and 19 with a layer 21 of phenolic resin impregnated paper being impregnated on the upper surface of the wood workpiece, a layer 22 of pattern paper placed over the layer 21, and a layer of melamine resin impregnated paper 23 placed on top of the pattern paper. A layer of melamine resin impregnated paper 24 is placed beneath the lower surface of the wood workpiece 20. The wood workpiece with the superimposed layers of thermosetting plastic is suitably forced between the shoes 18 and 19 and as shown is frictionally carried between opposed traveling thin sheets or shims 25. These sheets are drawn over the working surfaces of the shoes to frictionally draw the wood workpiece with them. The sheets or shims are preferably a part of a machine for obtaining continuous movement as will be described in connection with FIGURES 1 and 2 wherein the shims are formed in endless belts powered by rolls.

The shoes 18 and 19 are provided with a first surface 26 which is heated and which is parallel to the path of travel of the wood workpiece 20, as indicated by the direction arrow on the workpiece. The workpiece and plastic layers then engage a sloping incline compression surface 27. The shoes then have a third surface 28 which holds the surfaces of the wood workpiece compressed and which also extends parallel to the direction of travel of the wood workpiece.

The first surface 26 is formed beneath preheat blocks 29 provided with a heating element 30. The preheat block, in a preferred form of the method, is heated to 365° F., but the temperature can be regulated independently as will be described in connection with FIGURE 8. The plastic layers are heated to a temperature where the plastic is in a highly viscous state and the function of the preheat blocks 29 is to bring the resin in the papers to sufficient cure under pressure so that they will maintain their integrity as they go by the compression step and not be taken so far into the cure that they will crack when going by. For example, if the heating block temperature is too low or if the work passes them too quickly the resin will be liquid as it passes the compression step. This causes hydraulic forces in the liquid to tear the paper. On the other hand, if the preheat blocks are too hot, or if the workpiece passes the preheat blocks too slowly, the resin in the paper can become embrittled before it flows into final place in the compressed overlaid papers. When this happens the surface has a cloudy appearance and cracks in extreme cases. The temperature of the plastic is of course dependent upon the heat of the preheat blocks and the speed at which the plastic travels past the blocks, and at proper temperature the impregnating resins are brought to a liquid of high viscosity before the compression step. The flow which then takes place is so limited that the carrier papers are not disrupted. For example, using a clear melamine impregnated overlaid paper on top of a melamine impregnated pattern paper placed over one half inch shavings board, preheat blocks six inches long at a temperature of 365° F. with a linear speed of five feet per minute have provided excellent results.

The pressure generated at the inclined surface 27 is a function of the compression step and the push back of the material. A resistance to the forward travel of the wood workpiece 20 is of course provided by the compression step which must be overcome by the force of the traveling shims 25.

To provide a sufficient lead in surface 26 for adequate frictional force on the workpiece, extensions 31 are mounted ahead of the preheat blocks 29. These extensions are not heated but are maintained cool such as by the provision of coolant passages 32. The extensions have a surface which is coplanar with the lower surface of the preheat blocks 29 and have a rounded lead-in nose portion over which the shims 25 travel. Insulation 33 is provided between the sections of the machine in order that the sections will retain their individual temperatures.

Directly after the compression surface 27 are located curing blocks 34 having heating elements 35. In a machine having preheat features as above discussed, the curing section was heated to 365° F. with the speed of travel of five feet per minute, a length of curing block 34 was chosen to give a total heating time of 25 seconds. The compression step for the surface 27 provided a surface compression of .050 inch. Cooling blocks 36 were chosen to afford a cooling time of 10 seconds. The cooling blocks 36 are provided with passages 37 for a coolant. The cooling section of course can be longer and is of sufficient length to drop the temperature of the plastic down to substantially 80° F.

As illustrated in FIGURE 8, the heating elements 30 and 35 for the preheat blocks and the curing blocks respectively are connected to a supply line 38 to be operated independently. A control 39 is provided for the preheat element and a control 40 is provided for the curing heating elements. These controls, which are shown schematically, may be thermostatic controls for maintaining a uniform heat and may be provided with a manual selector whereby the heat maintained can be selectively changed.

As illustrated in FIGURES 1 and 2, the belt shims 25 are carried in upper and lower frames 41 and 41'. The belts are supported on rollers and each of the frames and rollers are substantially identical in construction. The belts successively pass around rollers 42, 43, 44, 45 and 46. The rollers 43 are driven by a suitable drive 47 and the rollers 44 are shiftable to provide tension in the belts as indicated by the arrowed lines 48. The space between the shoes 18 and 19 is controlled by selecting the desired size and number of removable blocks 52, 53, 54 and 55. The attachment member 49, FIGURE 2, is shown in the shape of an I. The ends of the I slide over surfaces 50 in the frames 41 and 41' and are provided with shim spacers 51 beneath the heads. It is necessary to remove attachment member 49 to install belt shims 25.

The thickness of the shim material used to draw the workpieces between the shoes is critical and the material must have a high tensile strength and is preferably of stainless steel. The material requirement is related to the shape of the surface 27 and must be sufficiently thin so that it is not cold worked by bending over the surface and must be sufficiently strong so that it will not exceed its yield point due to the force required to draw the workpiece through the shoes 18 and 19.

It has been found that an optimum shape for the step is formed by curved surfaces meeting each other with each curved surface forming the segment of an arc of a cylinder. As shown in FIGURE 7, the surface 27 is shown provided by a portion 27a which is a segment or an arc of cylinder 52 shown in dotted line form. The latter portion of the surface 27 is shown at 27b as being a segment of the arc of a cylinder 53 shown in dotted line form.

FIGURE 6 shows an arrangement embodying the principles of the invention for forming thin laminated plastic sheets not supported on a wood workpiece. The pressure generated by the process and mechanism in the structure above described is a function of the compression step and push back of the material. In the arrangement of FIGURE 6, the shoes 18 and 19 of the structure of FIGURES 1, 3 and 6 may be employed. However, where a wood workpiece is not used, if the manufacturing tolerance for the shoes is plus or minus .005 inch, it will be impossible to mold a plastic sheet .010 inch thick because the pressures generated would vary extremely. This is avoided by using an elastic material shown in the form of a flat elastic pad 56, sufficiently rigid to produce the pressure desired. The pad is carried through between an upper plastic sheet 55 and a lower plastic sheet 56. These sheets are formed from a plurality of layers of separate sheets. In laminated plastics, it is common to utilize a base or backing sheet of a number of layers illustrated at 57 as perhaps utilizing seven separate layers of core stock in the form of a phenolic resin impregnated paper. On the core stock sheets is a melamine impregnated paper pattern sheet 58 which is overlaid by a melamine impregnated paper clear overlay sheet 59. To prevent the lowermost core stock sheet from adhering to the pad 56, a flexible thin steel separator plate 60 is placed on both sides of the resilient pad 56.

As a brief summary of operation, a wood workpiece, FIGURE 4, is fed between opposed shoes 18 and 19 with layers 21, 22 and 23 of a thermosetting plastic impregnated paper laid on the upper finished surface of the workpiece, and a layer 24 of thermosetting plastic impregnated paper on the lower layer. The workpiece and plastic layers are carried between the shoes by the traveling shims or belts 25. The layers are preheated by a surface 26 to bring the plastic to a viscous state, the surface of the wood is compressed by compressing surface 27, and the plastic is cured by the surfaces of the blocks 34. The plastic is then immediately cured by the blocks 36 providing a finished board with a wood core 11, FIGURE 5, with hardened surface layers 12 and 13 on the core, and with cured plastic layers 14 on the bottom surface, and 15, 16 and 17 on the top finished surface.

The method of compressing the surface of the wood beneath the plastic also compensates for original unevenness or roughness in the wood. The wood will compress to different depths with uneven surfaces and the compressed layer will actually be pressed down into the core for different depths leaving a smooth outer surface with only minor deviations remaining. This makes it possible to use rougher wood than could be used with methods heretofore practiced.

For determining the various relationships and factors necessary in order to provide a shim or belt 25 of the proper thickness, and in order to provide a lead-in surface 26 of the proper length, the following computations are given by way of example.

*Pulling Force Required Due to Step Action*

Figure 10:
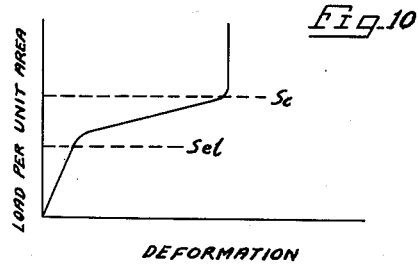

FIGURE 9 is an illustration shown schematically of the compression step performed on the wood, where L and H are the length and height of the compression surface 27, $\theta$ is the angle of the compression surface with the horizontal, P is the pressure normal to the surface, $P_v$ and $P_h$ are the vertical and horizontal components of pressure, $d_1$ is the dimension or depth of totally compressed wood and $d_2$ is the depth of partially compressed wood being fully compressed at the top and decreasing in density linearly to the bottom where wood has a natural density, and the other letters represent points on the diagram. FIGURE 10 shows deformation of the wood ploted against load per unit area.

$$P_h = P \sin \theta$$

$$\sin \theta = \frac{H}{\sqrt{H^2+L^2}}$$

$$S_c = \frac{P}{XZ} \text{ (per unit width)}$$

therefore $P = (S_c)(\overline{XZ})$ $$\overline{XZ} = \sqrt{L^2+(H+d_1)^2}$$

therefore $P = S_c\sqrt{L^2+(H+d_1)^2}$ and $$P_h = \frac{H}{\sqrt{H^2+L^2}} S_c \sqrt{L^2+(H+d_1)^2}$$

where $d_1=0$ (no finite layer of completely densified wood)

$$P_h = HS_c$$

*Lead-In Required to Overcome Force Due to Step Action and Friction*

Figure 11:
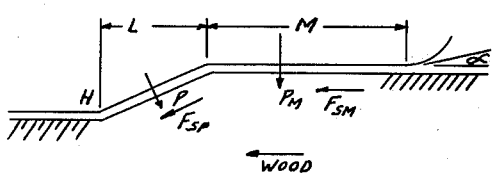

Reference for the following computation is made to FIGURE 11 wherein H and L are again dimensions of the step, M is the length of the lead-in surface, ($\alpha$) is at the angle of the lead-in surface, $P_m$ is the pressure between the workpiece and the lead-in surface, $F_{sp}$ and $F_{sm}$ are the frictional forces for the step surface and the pulling surface respectively. $S_{el}$ and $S_c$ are the elastic limit stress and the crushing stress respectively.

Per unit width, $P_m = MS_{el}$ $f$ = coefficient of friction—wood to steel therefore, $F_{sm} = P_m f = fMS_{el}$.

Likewise, $F_{sp} = Pf = S_c\sqrt{L^2+(H+d_1)^2} \cdot f$.

Total pulling force in belt, $F_s = F_{sm} + F_{sp} \geq P_h$.

At balance—

$$(P_m f) = fMS_{el} + fS_c \frac{(Pf)}{\sqrt{L^2+(H+d_1)^2}} = HS_c \frac{\sqrt{L^2+(H+d_1)^2}}{\sqrt{L^2+H^2}} = (P_h)$$

therefore $$M \geq \frac{S_c}{S_{el}}\left[\frac{1}{f}\sin\theta - 1\right]\sqrt{L^2+(H+d_1)^2}$$

For a self-locking condition by the step, M can be 0. For this to be true, $$\frac{1}{f}\sin\theta - 1 \leq 0 \text{ or } \frac{1}{f}\sin\theta \leq 1$$

Using this consideration for the lead-in, $\sin \alpha \leq f$.

*Relationship Between Slope of Step and Shim Bending When Step Is Formed From Axis of Tangential Cylinders*

Figure 12:
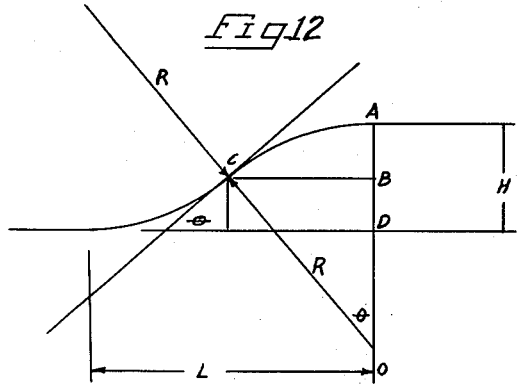

The symbols of the computations below refer to FIGURE 12, and the symbols will be self-explanatory.

$$\overline{OA} = \overline{OC} = R$$

$$\overline{AB} = \overline{BD} = \frac{H}{2}$$

$$M = \text{slope} = \tan \theta = \frac{\overline{BC}}{\overline{OB}}$$

$$\overline{OB} = \overline{OA} - \overline{AB} = R - \frac{H}{2}$$

$$\overline{BC} = \sqrt{\overline{OC}^2 - \overline{OB}^2} = \sqrt{R^2 - \left(R - \frac{H}{2}\right)^2}$$

therefore $$M = \frac{\sqrt{R^2 - \left(R - \frac{H}{2}\right)^2}}{R - \frac{H}{2}}$$

$$M = \sqrt{\frac{RH - \left(\frac{H}{2}\right)^2}{R^2 - RH + \left(\frac{H}{2}\right)^2}}$$

$$\frac{1}{M} = \frac{L}{H} \text{ approx.}$$

Let $$\frac{L}{H} = N \text{ (slope)}$$

R is in the range of 1″ to 2″.
H is no larger than ⅛″. Therefore $$\left(\frac{H}{2}\right)^2$$

is quite small compared to R.
Therefore as a close approximation, $$\frac{1}{M} = \frac{L}{H} = N = \sqrt{\frac{R^2 - RH}{RH}}$$

$$N^2 = \frac{R^2 - RH}{RH} = \frac{R-H}{H}$$

$$R - H = HN^2$$

$$R = H(N^2 - 1)$$

*Stress in Belt Due to Bending*

Figure 13:
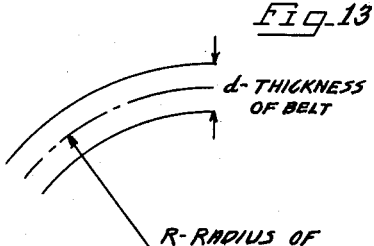

For the following, reference is made to FIGURE 13 and to the symbols used above.

$$R = \frac{E}{S_{bend}} \times \frac{d}{2} = H(N^2-1)$$

E is Young's modulus of elasticity.
$S_{bend}$ is fibre stress (basic stress formula).
Solving for $d$, $$d = \frac{2HS_{bend}(N^2-1)}{E}$$

Also, $$d \geq \frac{F}{S_{tens.}} \text{ (for unit width)}$$

where F is total pull in tension and $S_{tens.}$ allowable stress in tension (per unit width).
For stress in tension equal to stress in bending, $$d^2 = \frac{F \cdot 2HS_{bend}(N^2-1)}{S_{tens} \cdot E}$$

$$d = \sqrt{\frac{2FH(N^2-1)}{E}}$$

*Tension Force in Belt*

Figure 14:
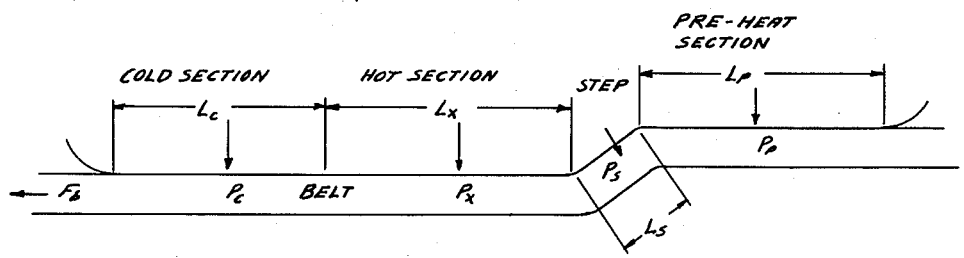

For the following analysis, reference is made to FIGURE 14 where the factors P indicate pressure and L indicate length. $F_b$ is the force on the belt. $P_h$ was deduced above.

$f$ = coefficient of friction-belt to platen.

$$F_b = P_c f_c + P_x f_x + P_s f_s + P_p f + P_h$$

$$P_c = L_c S_{el}, \quad P_x = L_x S_{el}, \quad P_p = L_p S_{el}$$

$$P_s = S_c \sqrt{L^2 + (H+d_1)^2}$$

$$P_s = S_c \sqrt{L^2 + H^2} = S_c L_s \text{ (where } d_1 = 0\text{)}$$

$$P_h = \frac{H S_c \sqrt{L^2 + (H+d_1)^2}}{\sqrt{L^2 + H^2}}$$

$$P_h = H S_c \text{ (where } d_1 = 0\text{)}$$

For most applications the temperatures in the pre-heat, step, and hot sections are very close to the same and therefore the coefficients of friction are equal in these areas.

$$F_b = S_{el}\left[f_c L_c + f_x\left(L_x + L_s \frac{S_c}{S_{el}} + L_p\right)\right] + H S_c \quad (d_1 = 0)$$

Because $L_s$ is about $\frac{3}{8}''$ and the total length is $12''$, this term can be approximated as $$F_b = S_{el}[f_c L_c + f_x(L_x + L_p)] + H S_c$$

The following is an example of a mechanism wherein the shim thickness is provided for a specific shoe design.

Requirements:

| | |
|---|---|
| Platen length _____ in__ | 12 |
| H (step height) _____ in__ | .090 |
| N (slope of step) _____ | 3½ to 1 |
| $f_x$ _____ | .014 |
| $f_c$ _____ | .003 |
| $d_1$ _____ | 0 |
| $S_{el}$ _____ | 4800 |
| $S_c$ _____ | 7800 |
| $L_p$ _____ in__ | 1 |
| $L_x$ _____ in__ | 6 |
| $L_c$ _____ in__ | 5 | from $$F_b = S_{el}[f_c L_c + f_x(L_x + L_p)] + H S_c$$

$$F_b = 4800[(.003)(5) + (.014)(6+1)] + (.090)(7800)$$

$$= 1{,}242 \text{ lbs. per in. of width}$$

Step design:

$$R = H(N^2 - 1)$$
$$= .090(12.25 - 1)$$
$$= 1.01 \text{ in., use } 1.0 \text{ in.}$$

Bending stress = total tension stress:

$$d = \sqrt{\frac{2FH(N^2 - 1)}{E}}$$

$$= \sqrt{\frac{2(.090)(1242)(11.25)}{30 \times 10}}$$

$$= .00915, \text{ use } .010 \text{ in.}$$

Check on length of pre-heat section for adequate friction to pull in work:

$$M \geq \frac{S_c}{S_{el}}\left[\frac{1}{f}\sin\theta - 1\right]\sqrt{L^2 + (H+d_1)^2}$$

$f$ for wood = .08
3½/1 = 16°
Sin 16° = .276

$$M = \frac{7800}{4800}\left[\frac{1}{.08}(.276) - 1\right]\sqrt{(.315)^2 + (.090)^2} = 1.25 \text{ in.}$$

Slope at lead to pre-heat
$$\sin\theta \leq f$$
$$\sin\theta = .08$$
$$\theta = 4\frac{1}{2}°$$

It will be understood that modifications and variations may be effected without departing from the spirit and scope of the novel concepts of the present invention.

We claim as our invention:

1. A flat laminated surface board comprising a single sheet of wood having an intermediate zone and an outer zone integral with said intermediate zone and forming one surface of said sheet of wood, said outer zone being compressed to a greater density than said intermediate zone and being of uniform thickness throughout said sheet of wood, and an outer layer of thermoset plastic supported on the one surface of said sheet of wood.

2. A flat laminated surface board comprising a single sheet of wood having an intermediate zone and an outer zone integral with said intermediate zone and forming one surface of said sheet of wood, said outer zone being compressed to a greater density than said intermediate zone and being of uniform thickness throughout said sheet of wood, and an outer layer of thermoset plastic supported on the one surface of said sheet of wood, said outer layer of thermoset plastic including an outer clear layer, an intermediate pattern layer, and an inner body layer supported on said outer zone of compressed wood.

3. A flat laminated surface board comprising a single sheet of wood having an intermediate zone and an outer zone integral with said intermediate zone and forming one surface of said sheet of wood, said outer zone being compressed to a greater density than said intermediate zone and being of uniform thickness throughout said sheet of wood, a body layer of phenolic resin on said outer zone of compressed wood, a pattern layer of melamine pattern paper on said body layer, and a finishing layer of substantially clear melamine resin on said pattern layer.

4. The method of molding a laminated surface board comprising positioning a desired number of layers of thermosetting plastic on a wood workpiece, heating the plastic to a viscous state, applying a progressing local pressure to the surface of the workpiece forcing the plastic thereagainst and exceeding to the compressive strength of the wood and forming a compressed layer beneath the plastic, and curing the plastic on the compressed layer of wood while maintaining the plastic under pressure.

5. The method of molding a laminated surface board comprising positioning a desired number of layers of thermosetting plastic on a wood workpiece, heating the plastic to a viscous state, applying a progressing local pressure to the surface of the workpiece forcing the plastic thereagainst exceeding the compressive strength of the wood and forming a compressed layer beneath the plastic, heating the plastic to a temperature for a time sufficient to cure the plastic over the compressed wood while maintaining the plastic under pressure, and immediately thereafter cooling the plastic.

6. The method of molding a laminated surface board comprising positioning a desired number of layers of thermosetting plastic on a wood workpiece, preheating the plastic to a viscous state, applying a progressing local pressure to the surface of the workpiece forcing the plastic thereagainst exceeding the compressive strength of the wood and forming a compressed layer beneath the plastic, heating the plastic after compression to a temperature of substantially 365° F. while maintaining pressure on the plastic, said preheating and heating extending for a period of time not substantially in excess of 25 seconds, and immediately thereafter while continuing to maintain pressure on the plastic cooling the plastic.

7. The method of molding a laminated surface board comprising the steps of positioning a layer of thermosetting plastic impregnated paper on a wood workpiece, rapidly heating the plastic to a temperature which will sufficiently cure the plastic to maintain its integrity under compression but so that it will not crack, applying a progressing local pressure to the surface of the plastic and the workpiece forcing the plastic against the workpiece and exceeding the compressive strength of the wood and forming a compressed layer beneath the plastic, continuing to maintain pressure on the plastic and the workpiece and immediately continuing heating of the plastic until it is set, and thereafter immediately rapidly cooling the plastic while maintaining such pressure.

8. The method of molding a laminated surface board comprising placing a first layer of thermosetting plastic on the finishing surface of a wood workpiece, placing a layer of material with a pattern over said first layer, placing a layer of substantially clear thermosetting plastic over said pattern layer, placing a sealing layer of thermosetting plastic on the back surface of said workpiece, preheating the plastic to a viscous state, applying local compressive pressures in excess of the compressive strength of the wood to both surfaces of the workpiece and progressively moving said pressures across the surfaces compressing both the surfaces and forcing the plastic thereagainst to form compressed layers beneath the plastic, and while maintaining pressures on both surfaces heat curing the plastic layers over the compressed layers of wood.

9. In a method of molding a laminated surface board, the steps comprising placing a finishing layer of thermosetting plastic on a finishing side of a wood workpiece, placing a sealing layer of thermosetting plastic of less thickness than said finishing layer on the other sealing side of the workpiece, preheating the plastic to a viscous state, and progressively applying local compression forces to both sides of the workpiece greater than the compressive strength of the wood and moving said forces across the surfaces of the workpiece forcing the plastic thereagainst to form layers of compressed wood under the plastic and compressing the sealing side to a depth greater than the finishing side.

10. In the process of molding papers impregnated with a plastic to wood surfaces, the steps comprising placing a plastic impregnated paper over the surface of a wood workpiece, preheating the plastic to a viscous state, and progressively applying a compression force along the wood surface pressing the plastic to the surface and compressing the wood beyond its elastic limit so that a permanently compressed wood layer is formed to support the plastic and softer sub-surface wood of variable hardness will not penetrate the compressed layer to affect the plastic.

11. The method of molding a laminated surface board comprising positioning a desired number of layers of thermosetting plastic on a wood workpiece, preheating the plastic to a viscous state, applying a progressing local pressure to the surface of the plastic forcing the plastic against the workpiece, heating the plastic after compression to a curing temperature of the plastic while maintaining pressure on the plastic, and immediately thereafter while continuing to maintain pressure on the plastic cooling the plastic.

References Cited in the file of this patent
UNITED STATES PATENTS

| | | |
|---|---|---|
| 1,663,506 | Mason | Mar. 20, 1928 |
| 1,952,664 | Esselen | Mar. 27, 1934 |
| 2,033,855 | Sloan | Mar. 10, 1936 |
| 2,136,730 | Sweetland | Nov. 15, 1938 |
| 2,263,661 | Walker | Nov. 25, 1941 |
| 2,321,258 | Stamm et al. | June 8, 1943 |
| 2,354,090 | Stamm et al. | July 18, 1944 |
| 2,497,712 | Auchter | Feb. 14, 1950 |
| 2,545,603 | Byers et al. | Mar. 20, 1951 |
| 2,661,789 | Keller | Dec. 8, 1953 |
| 2,666,463 | Heritage | Jan. 19, 1954 |
| 2,699,417 | Repsher et al. | Jan. 11, 1955 |
| 2,831,794 | Elmendorf | Apr. 22, 1958 |
| 2,857,302 | Burton et al. | Oct. 21, 1958 |
| 2,927,620 | Elliott | Mar. 8, 1960 |